US011093795B2

(12) United States Patent
Chae et al.

(10) Patent No.: US 11,093,795 B2
(45) Date of Patent: Aug. 17, 2021

(54) ARTIFICIAL INTELLIGENCE SERVER FOR DETERMINING DEPLOYMENT AREA OF ROBOT AND METHOD FOR THE SAME

(71) Applicant: LG ELECTRONICS INC., Seoul (KR)

(72) Inventors: Jonghoon Chae, Seoul (KR); Esther Park, Seoul (KR); Suil Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 83 days.

(21) Appl. No.: 16/569,558

(22) Filed: Sep. 12, 2019

(65) Prior Publication Data
US 2020/0005085 A1 Jan. 2, 2020

(30) Foreign Application Priority Data
Aug. 9, 2019 (KR) .......................... 10-2019-0097552

(51) Int. Cl.
G06K 9/62 (2006.01)
G06K 19/00 (2006.01)
G06N 3/08 (2006.01)
G06N 3/04 (2006.01)
G06F 40/30 (2020.01)
(Continued)

(52) U.S. Cl.
CPC ......... G06K 9/6256 (2013.01); G06F 40/279 (2020.01); G06F 40/30 (2020.01); G06K 9/00288 (2013.01); G06K 9/00664 (2013.01); G06K 9/00778 (2013.01); G06N 3/04 (2013.01); G06N 3/08 (2013.01)

(58) Field of Classification Search
CPC ............ G06K 9/6256; G06K 9/00664; G06K 9/00288; G06N 3/08; G06N 3/04; G06F 17/2785; G06F 17/2765
See application file for complete search history.

(56) References Cited
U.S. PATENT DOCUMENTS

2019/0166458 A1* 5/2019 Deluca ................ H04W 68/005
2019/0286885 A1* 9/2019 Liu ....................... G06K 9/6273
(Continued)

FOREIGN PATENT DOCUMENTS

JP 2019000940 1/2019
KR 1020180029742 3/2018
(Continued)

OTHER PUBLICATIONS

Korean Intellectual Property Office Application No. 10-2019-0097552, Office Action dated Sep. 25, 2020, 7 pages.

Primary Examiner — Kevin Ky
(74) Attorney, Agent, or Firm — Lee, Hong, Degerman, Kang & Waimey

(57) ABSTRACT

An artificial intelligence server for determining a deployment area of a robot includes a memory and a processor. The memory is configured to store density data for a control area. The processor is configured to obtain a plurality of current context keywords corresponding to a current time point, determine at least one related keyword among the obtained plurality of current context keywords using the density data, and determine the deployment area of the robot based on density data corresponding to the determined related keyword.

10 Claims, 16 Drawing Sheets

(51) Int. Cl.
*G06F 40/279* (2020.01)
*G06K 9/00* (2006.01)

(56) References Cited

U.S. PATENT DOCUMENTS

2019/0287063 A1\* 9/2019 Skaaksrud ........... B65D 88/524
2019/0358814 A1   11/2019 Park et al.

FOREIGN PATENT DOCUMENTS

KR   1020180039436   4/2018
KR   1020180054505   5/2018

\* cited by examiner

| 601→ | 1 | 3 | 0 | 2 | 5 |
|---|---|---|---|---|---|
| | 4 | 3 | 2 | 1 | 8 |
| | 0 | 8 | 2 | 1 | 7 |
| | 5 | 3 | 2 | 5 | 2 |
| | 2 | 4 | 1 | 2 | 1 |

ARTIFICIAL INTELLIGENCE SERVER FOR DETERMINING DEPLOYMENT AREA OF ROBOT AND METHOD FOR THE SAME

CROSS-REFERENCE TO RELATED APPLICATIONS

Pursuant to 35 U.S.C. § 119(a), this application claims the benefit of earlier filing date and right of priority to Korean Patent Application No(s). 10-2019-0097552, filed on Aug. 9, 2019, the contents of which are hereby incorporated by reference herein in its entirety.

BACKGROUND

The present invention relates to an artificial intelligence server for determining a deployment area of a robot and a method for the same. Specifically, the present invention relates to an artificial intelligence server for determining a deployment area of a robot based on factors influencing density in a control area, and a method for the same.

Recently, with the explosive growth of airport users and efforts to leap to smart airports, methods for providing services through artificial intelligence robots in airports or multiplexes are being discussed.

In a case in which artificial intelligence robots are introduced at airports or multiplexes, it is expected that robots can take on the unique role of human beings, which traditional computer systems could not replace, thereby contributing to the quantitative and qualitative improvement of provided services.

Artificial intelligence robots can perform various operations such as informing the users of directions at airports and various places where a lot of people gather.

If the factors influencing the density in the control area are identified and the deployment area of the robot is set based on the factors, the service can be more efficiently provided to the people.

SUMMARY

The present invention is directed to provide an artificial intelligence server for determining a context that has a great influence on a density for a control area and determining an area where the density is expected to be high based on the determined context as a deployment area of the robot, and a method for the same.

One embodiment of the present invention provides an artificial intelligence server and a method for the same, wherein the artificial intelligence server obtains density data for a control area, obtains a plurality of current context keywords corresponding to a current time point, determines at least one related keyword among the obtained plurality of current context keywords using the density data, and determines the deployment area of the robot based on density data corresponding to the determined related keyword.

In addition, one embodiment of the present invention provides an artificial intelligence server and a method for the same, wherein the artificial intelligence server generates context keyword combinations from current context keywords, determines a confidence level for each of the context keyword combinations, and determines a related keyword based on the determined confidence level.

Furthermore, one embodiment of the present invention provides an artificial intelligence server and a method for the same, wherein the artificial intelligence server selects density data including all the determined related keywords from the density data, calculates an average value of density for each of group areas using the selected density data, and determines the deployment area of the robot based on the calculated average value of the density.

The details of one or more embodiments are set forth in the accompanying drawings and the description below. Other features will be apparent from the description and drawings, and from the claims.

BRIEF DESCRIPTION OF THE DRAWINGS

FIG. 6 is a view illustrating a density measured for each unit area according to an embodiment of the present invention.

FIG. 11 is a view illustrating a method for determining priorities among group areas having the same density according to an embodiment of the present invention.

FIG. 12 is a view illustrating an example of density data for a control area illustrated in FIG. 6.

DETAILED DESCRIPTION OF THE EMBODIMENTS

Figure 1:
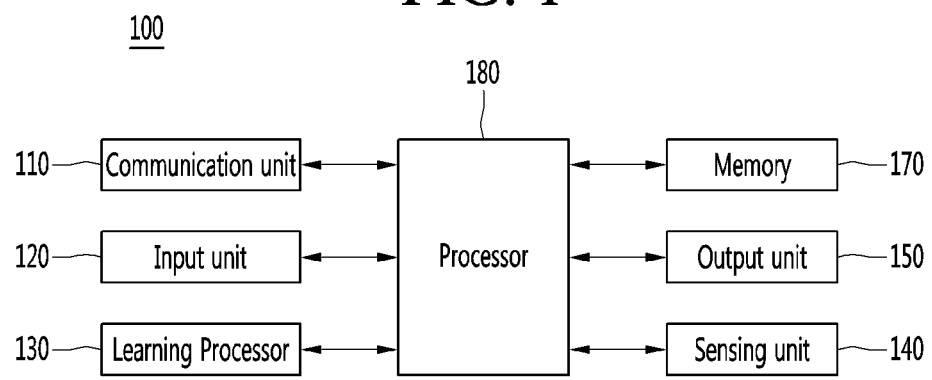
FIG. 1 is a block diagram illustrating an AI apparatus according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensing unit 140, an output unit 150, a memory 170, and a processor 180.

The communication unit 110 may transmit and receive data to and from external devices such as other 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensing unit 140 may acquire at least one of internal information about the AI apparatus 100, ambient environment information about the AI apparatus 100, and user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
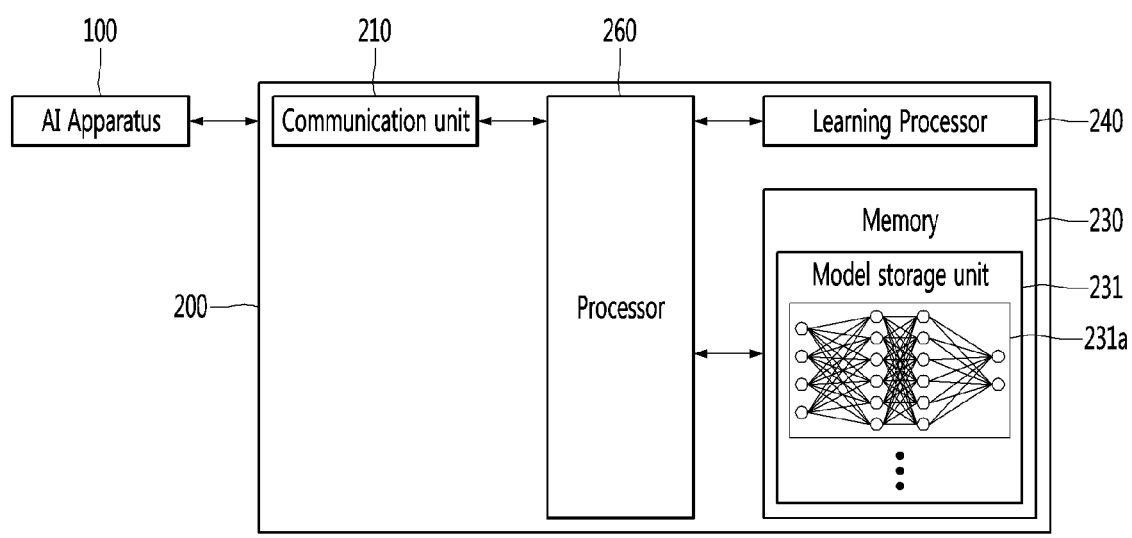
FIG. 2 is a block diagram illustrating an AI server according to an embodiment of the present invention.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
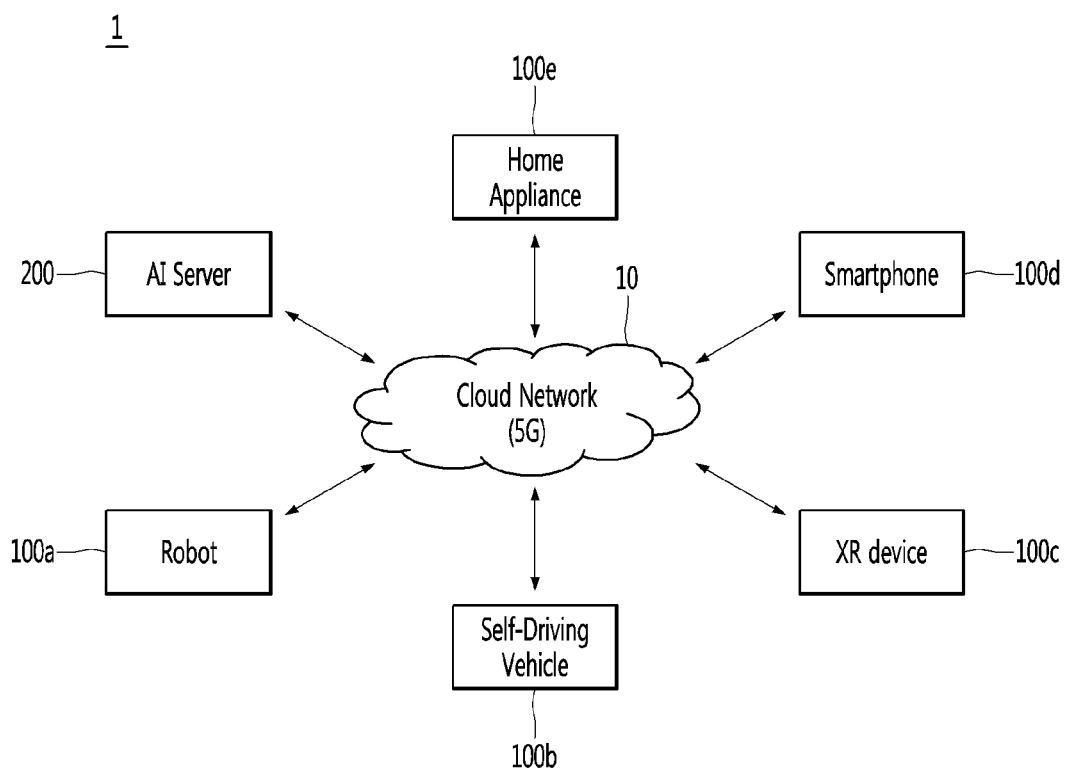
FIG. 3 is a view illustrating an AI system according to an embodiment of the present invention.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
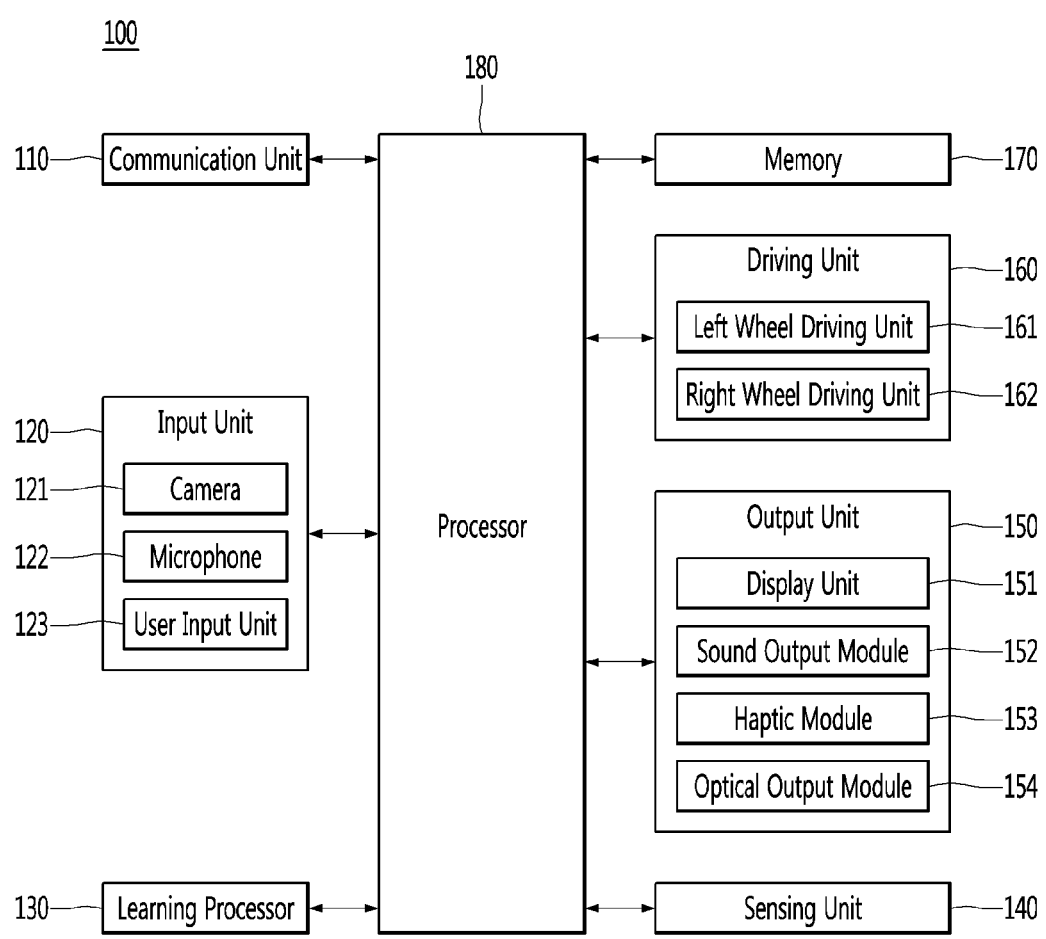
FIG. 4 is a block diagram illustrating an AI apparatus according to an embodiment of the present invention.

FIG. 4 is a block diagram illustrating an AI apparatus 100 according to an embodiment of the present invention.

The redundant repeat of FIG. 1 will be omitted below.

Hereinafter, the AI apparatus 100 may be referred to as an AI robot 100, and the terms "AI apparatus" and "AI robot" may be used as the same meaning unless otherwise distinguished.

Referring to FIG. 4, the AI robot 100 may further include a driving unit 160.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensing unit 140 may also be referred to as a sensor unit.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

The driving unit 160 may move the AI robot 100 in a specific direction or by a specific distance.

The driving unit 160 may include a left wheel driving unit 161 for driving a left wheel of the AI robot 100 and a right wheel driving unit 162 for driving a right wheel of the AI robot 100.

The left wheel driving unit 161 may include a motor for driving the left wheel, and the right wheel driving unit 162 may include a motor for driving the right wheel.

In FIG. 4, an example in which the driving unit 160 includes the left wheel driving unit 161 and the right wheel driving unit 162 has been described, but the present invention is not limited thereto. That is, in one embodiment, the driving unit 160 may include only one wheel, or may include three or more wheels.

Figure 5:
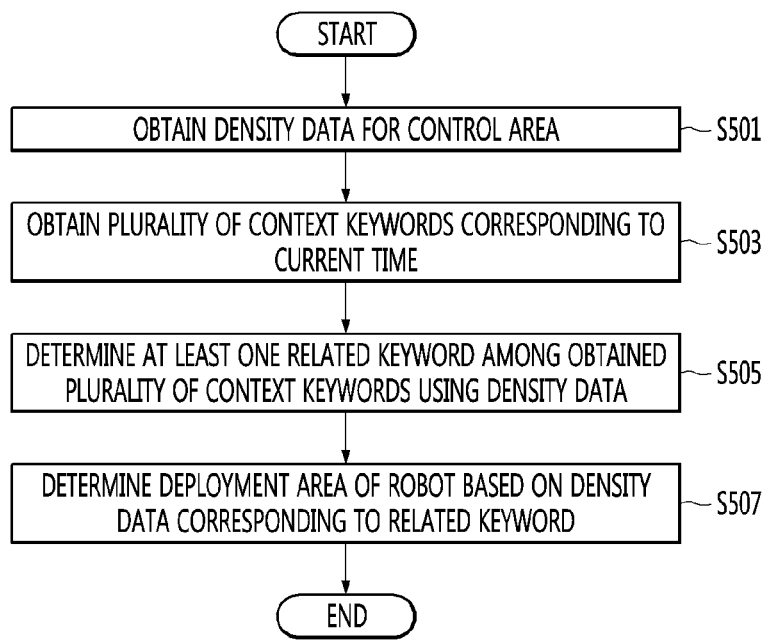
FIG. 5 is a flowchart illustrating a method for determining a deployment area of a robot according to an embodiment of the present invention.

FIG. 5 is a flowchart illustrating a method for determining a deployment area of a robot according to an embodiment of the present invention.

The AI server 200 may communicate with at least one robot or AI robot 100, and the AI server 200 may determine the route of the robot or AI robot 100.

That is, the AI server 200 may determine at least one route from a general robot having no AI function and the AI robot 100 having the AI function.

Hereinafter, unless otherwise specified, the robot includes an AI robot 100.

Here, the AI server 200 may be a server constituting a control system for controlling at least one robot disposed in an airport or a building. The AI server 200 may control at least one robot.

Referring to FIG. 5, the processor 260 of the AI server 200 obtain density data for a control area (S501).

The control area may mean an entire area in which the AI server 200 provides a guidance service using robots, or may be referred to as an entire area. That is, the AI server 200 may determine the moving line of the robot within the control area.

That is, the control area may mean the maximum activity range of the robot.

The control area may include a plurality of unit areas, and each of the unit areas may be set to a predetermined shape and size.

Here, each unit area may have a rectangular or square shape, but the present invention is not limited thereto.

Here, the areas of the respective unit areas may be the same, but the present invention is not limited thereto.

The memory 230 of the AI server 200 may store location information indicating the location of each of the plurality of unit areas. The location information may be coordinates of the unit area.

The memory 230 may store the density data for the control area.

Here, the processor 260 may load the density data for the control area, which is stored in the memory 230.

The density data for the control area may include metadata for target time points of calculating density and the density for the control areas calculated at multiple time points. The multiple time points include past times.

The metadata for the time point of calculating the density is context data indicating a situation at the target time point of calculating the density of the control area, and may include information such as time, day, weather, season, and date. Each item included in the context data, such as time, day, weather, season, and date, may be referred to as a context keyword.

The density for the control area may include not only the density representing the entire control area, but also the densities for some areas included in the control area.

That is, the density for the control area may include a density for the entire control area, a density for each of the unit areas constituting the control area, a density for each of the group areas including a plurality of unit areas, and the like.

Here, the density for the control area may mean a density distribution for the control area.

The density for the control area may be calculated by the processor 260.

The processor 260 may receive at least one of the image data or the speech data collected in the control area, and calculate the density for the control area using the received image data or the received speech data.

Here, the processor 260 may receive image data photographed for one or more unit areas from robots deployed in the control area. That is, each of the robots may obtain image data using a camera, and transmit the obtained image data to the AI server 200.

Here, the processor 260 may receive image data photographed for at least one unit area from at least one camera looking at the control area. The camera looking at the control area may include Closed-Circuit Television (CCTV).

Here, the processor 260 may receive speech data uttered by users, collected in at least one unit area, from at least one microphone installed in the control area.

Here, the processor 260 may receive speech data collected from the robots deployed in the control area. That is, each of the robots may use a microphone to receive the speech of the user, and transmit speech data for the received speech to the AI server 200.

By default, the processor 260 calculates the density at the present time (current density), but if necessary, the processor 260 may calculate the density at the past time using image data collected at the past time.

The processor 260 may calculate the number of users included in each unit area, and determine the calculated number of users as the density for each unit zone. In addition, the processor 260 may calculate the density for the group areas based on the calculated density for each unit area.

Here, the processor 260 may extract the faces of the users included in the received image data, and determine the number of users included in each unit area based on the extracted number of faces.

Here, the processor 260 may extract the faces of the users from the image data using a image recognition model. The image recognition model may be an artificial neural network based model learned by using a deep learning algorithm or a machine learning algorithm.

Here, the processor 260 may determine the number of users included in each unit area by using the received speech data.

Here, the processor 260 may extract a plurality of frequency bands from the received speech data, and determine the number of users included in each unit area based on the extracted number of frequency bands.

Here, the processor 260 may determine the number of users included in each unit area based on the sound volume of the received speech data.

The processor 260 of the AI server 200 obtains a plurality of context keywords corresponding to the current time (S503).

The context keyword corresponding to the current time may be referred to as a current context keyword.

The context keyword may include a keyword indicating time, day, weather, season, date, or the like.

The context keyword corresponding to time may be expressed as an accurate time point, but may be expressed as a time interval of a predetermined size. For example, the context keyword corresponding to the time may be expressed as a time interval of 1 second unit, such as 15:00:01, may be expressed as a time interval of 1 minute unit, such as 15:01, or may be expressed as a time interval of 5 minutes, such as 15:00 to 15:05.

Time information may be obtained using a timer embedded in the AI server 200 or internet time, etc., and the context keyword related to time, day, season, and date may be obtained based on the obtained time information.

Here, the processor 260 may obtain context keywords by essentially including the keyword indicating the time.

The processor 260 of the AI server 200 determines at least one related keyword from the obtained plurality of context keywords using the density data (S505).

The related keyword refers to a context keyword that is related to the density for the control area or exerts an influence of a certain level or more on the density for the control area among the context keywords corresponding to the current situation.

For example, if the processor 260 obtains context keywords including the keyword for the time, the keyword for the weather, and the keyword for the season and the density in the control area is determined to be related to the weather, the processor 260 may determine the keyword for the weather as the related keyword.

The processor 260 may calculate an association degree or a confidence level for each context keyword and determine the related keyword based on the calculated association degree or the calculated confidence level.

For example, the processor 260 may determine a predetermined number of context keywords as the related keyword in the descending order of the calculated association degree or the calculated confidence level.

For example, the processor 260 may determine, as the related keywords, context keywords whose calculated association level or confidence level exceeds a predetermined threshold.

The processor 260 of the AI server 200 determines the deployment area of the robot based on the density data corresponding to the related keywords (S507).

The processor 260 may select density data corresponding to the related keywords determined from the obtained density data, and determine the dense area in which users (persons) are expected to be crowded, based on the selected density data. The area determined to be the dense area may be determined as the deployment area of the robot.

Here, the processor 260 may calculate an average value of the densities for the respective group areas from the selected density data, calculate the priorities for the respective group areas based on the calculated average value of the densities, and determine the group area having the highest priority as the dense area.

Furthermore, the processor 260 may determine a change pattern of the dense area based on the density data corresponding to the related keywords, and determine a deployment area sequence of the robot based on the determined change pattern of the dense area.

The deployment area sequence may include a setting time of the deployment area (or a change time of the deployment area) and deployment areas at that time.

Here, the deployment area sequence may include deployment areas at predetermined time intervals, or may include only the time when the deployment area is changed and the deployment area at that time.

Figure 6:
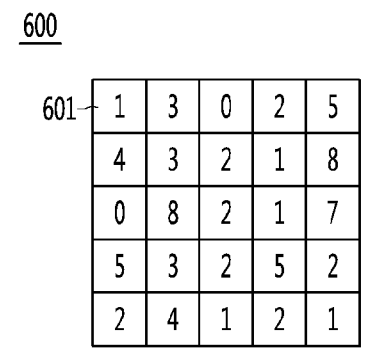

FIG. 6 is a view illustrating the density measured for each unit area according to an embodiment of the present invention.

Referring to FIG. 6, the entire area 600 may include a plurality of unit areas.

In FIG. 6, the entire area 600 includes 25 unit areas 601 arranged in the form of 5×5, but the present invention is not limited thereto.

Each unit area 601 corresponds to a density measured for each unit area.

For example, the unit areas 601 constituting the first row of the entire area 600 have a measured density of [1, 3, 0, 2, 5].

The memory 230 may store location information indicating the location of each unit area 601. The location information of each unit area 601 may be center coordinates of each unit area.

The processor 260 may obtain location information of each unit area 601 by using a location measurement module such as a GPS module.

Figure 7:
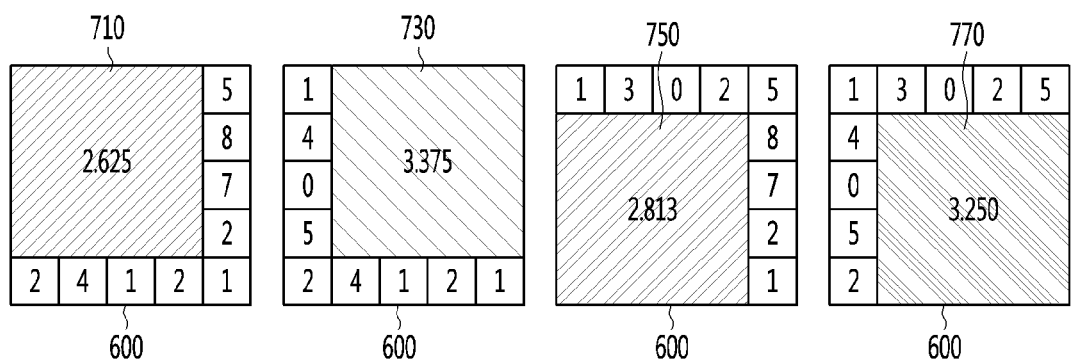
FIGS. 7 to 9 are views illustrating a method for calculating a density for a group area according to an embodiment of the present invention.
Figure 8:
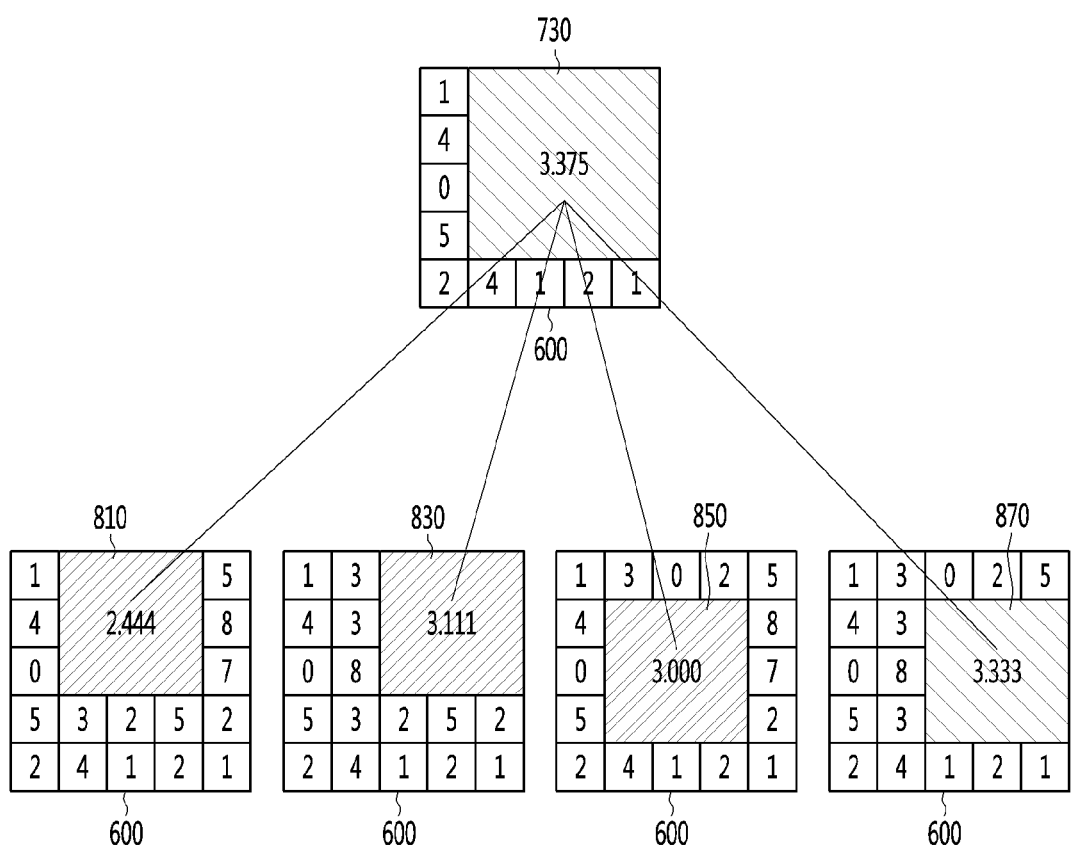
Figure 9:
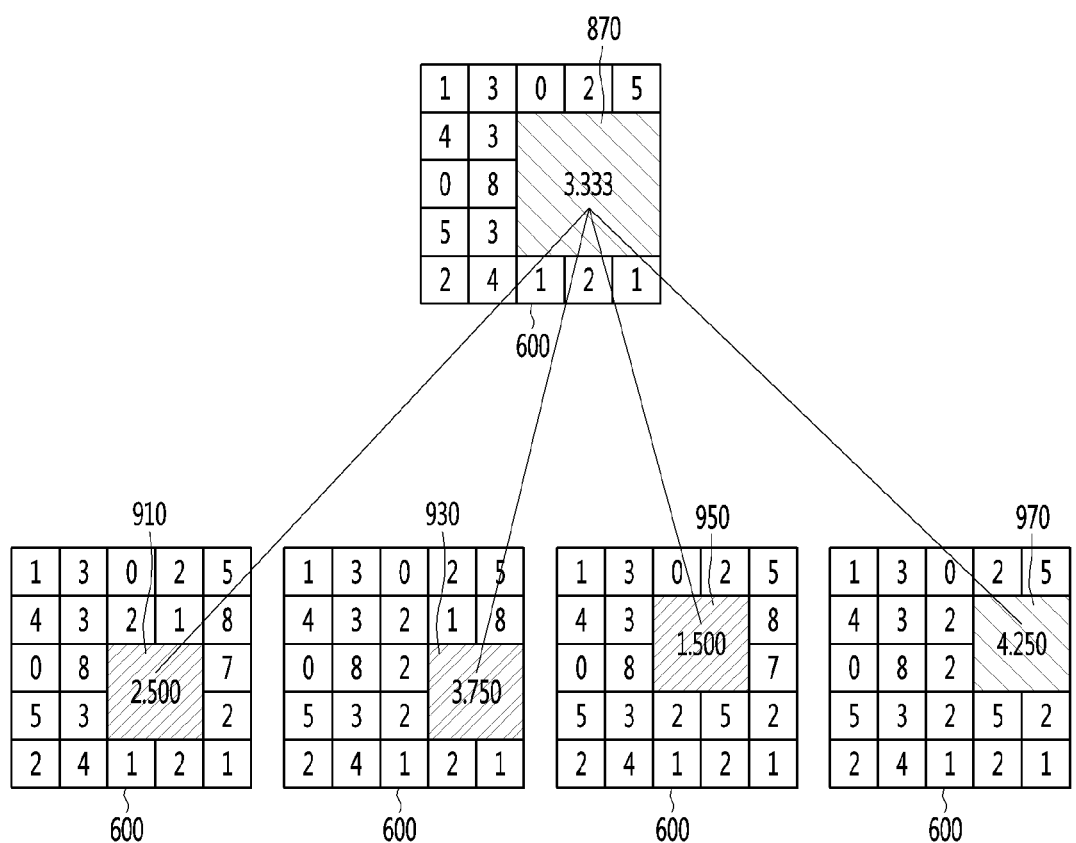

FIGS. 7 to 9 are views illustrating a method for calculating a density for a group area according to an embodiment of the present invention.

FIGS. 7 to 9 illustrate a method for calculating densities for group areas including a plurality of unit areas 601 using the example of the entire area 600 shown in FIG. 6.

Referring to FIG. 7, the entire area 600 having the form of 5×5 may be divided into four 4×4 group areas 710, 730, 750, and 770.

Each of the group areas 710 to 770 may include 16 unit areas in the form of 4×4.

The memory 230 may store location information indicating the location of each group area. The location information of each group area may be center coordinates of each group area.

The processor 260 may calculate an average value of the densities for the unit areas included in each group area, and determine the average value as the density for the corresponding group area.

The density for the first group area 710 may be an average value of the densities measured for the plurality of unit areas included in the first group area 710. That is, the density for the first group area 710 may be calculated as (1+3+0+2+4+3+2+1+0+8+2+1+5+3+2+5)/16=2.625.

The density for the second group area 730 may be an average value of the densities measured for the plurality of unit areas included in the second group area 730. That is, the density for the second group area 730 may be calculated as 3.375.

The density for the third group area 750 may be an average value of the densities measured for the plurality of unit areas included in the third group area 750. That is, the density for the third group area 750 may be calculated as 2.813.

The density for the fourth group area 770 may be an average value of the densities measured for the plurality of unit areas included in the fourth group area 770. That is, the density for the fourth group area 770 may be calculated as 3.250.

The calculated densities for the first to fourth group areas 710 to 770 may be used when the processor 260 determines the area or the route of the robot to which the robot should move preferentially within the entire area 600.

In addition, the calculated densities for the first to fourth group areas 710 to 770 may be used when the processor 260 determines the priority between the respective group areas 710 to 770. The priority may mean priority as a destination to which the robot should move.

For example, as the calculated density is greater, the higher priority may be given to the group area.

That is, within the entire area 600, the second group area 730 may be determined as the first priority, the fourth group area 770 may be determined as the second priority, the third group area 750 may be determined as the third priority, and the first group area 710 may be determined as the fourth priority.

Furthermore, referring to FIG. 8, the 4×4 second group area 730 may be divided into four 3×3 subgroup areas 810, 830, 850, and 870.

In FIG. 8, only an example of dividing the second group area 730 into subgroup areas is illustrated, but not only the second group area 730 but also other first, third, and fourth group areas 710, 750, and 770 may be divided into four 3×3 subgroup areas.

Each of the subgroup areas 810 to 870 may include 9 unit areas in the form of 3×3.

The memory 230 may store location information of each subgroup area. The location information of each subgroup area may be center coordinates of each subgroup area.

The processor 260 may calculate the density for each of the plurality of subgroup areas 810 to 870 constituting the second group area 730 so as to identify a more dense area within the second group area 730.

The processor 260 may calculate an average value of the densities for the unit areas included in each subgroup area, and determine the average value as the density for the corresponding subgroup area.

The density for the first subgroup area 810 may be an average value of the densities measured for the plurality of unit areas included in the first subgroup area 810. That is, the density for the first subgroup area 810 may be calculated as $(3+0+2+3+2+1+8+2+1)/9=2.444$.

The density for the second subgroup area 830 may be an average value of the densities measured for the plurality of unit areas included in the second subgroup area 830. That is, the density for the second subgroup area 830 may be calculated as 3.111.

The density for the third subgroup area 850 may be an average value of the densities measured for the plurality of unit areas included in the third subgroup area 850. That is, the density for the third subgroup area 850 may be calculated as 3.0.

The density for the fourth subgroup area 870 may be an average value of the densities measured for the plurality of unit areas included in the fourth subgroup area 870. That is, the density for the fourth subgroup area 870 may be calculated as 3.333.

The calculated densities for the first to fourth subgroup areas 810 to 870 may be used when the processor 260 determines the area or the route of the robot to which the robot should move preferentially within the second group area 730.

In addition, the calculated densities for the first to fourth subgroup areas 810 to 870 may be used when the processor 260 determines the priority between the respective subgroup areas 810 to 870. The priority may mean priority as a destination to which the robot should move.

For example, as the calculated density is greater, the higher priority may be given to the subgroup area.

That is, within the second group area 730, the fourth subgroup area 870 may be determined as the first priority, the second subgroup area 830 may be determined as the second priority, the third subgroup area 850 may be determined as the third priority, and the first subgroup area 810 may be determined as the fourth priority.

Further, referring to FIG. 9, the 3×3 fourth subgroup area 870 may be divided into four 2×2 lowest group areas 910, 930, 950, and 970.

In FIG. 9, only an example of dividing the fourth subgroup area 870 into the lowest group areas is illustrated, but not only the fourth subgroup area 870 but also the other first to third subgroup areas 810, 830, and 850 may be divided into four 2×2 lowest group areas.

Each of the lowest group areas 910 to 970 may include four 2×2 unit areas.

The memory 230 may store location information of each lowest group area. The location information of each lowest group area may be center coordinates of each lowest group area.

The processor 260 may calculate the density for each of the plurality of lowest group areas 910 to 970 constituting the fourth subgroup area 870 so as to identify a more dense area within the fourth subgroup area 870.

The processor 260 may calculate an average value of the densities of the unit areas included in each lowest group area, and determine the average value as the density for the lowest group area.

The density for the first lowest group area 910 may be an average value of the densities measured for the plurality of unit areas included in the first lowest group area 910. That is, the density for the first lowest group area 910 may be calculated as $(2+1+2+5)/4=2.5$.

The density for the second lowest group area 930 may be an average value of the densities measured for the plurality of unit areas included in the second lowest group area 930. That is, the density for the second lowest group area 930 may be calculated as 3.75.

The density for the third lowest group area 950 may be an average value of the densities measured for the plurality of unit areas included in the third lowest group area 950. That is, the density for the third lowest group area 950 may be calculated as 1.5.

The density for the fourth lowest group area 970 may be an average value of the densities measured for the plurality of unit areas included in the fourth lowest group area 970. That is, the density for the fourth lowest group area 970 may be calculated as 4.25.

The calculated densities for the first to fourth lowest group areas 910 to 970 may be used when the processor 260 determines the area or the route of the robot to which the robot should move preferentially within the fourth subgroup area 870.

In addition, the calculated densities for the first to fourth lowest group areas 910 to 970 may be used when the processor 260 determines the priority between the respective lowest group areas 910 to 970. The priority may mean priority as a destination to which the robot should move.

For example, as the calculated density is greater, the higher priority may be given to the lowest group area.

That is, within the fourth subgroup area 870, the fourth lowest group area 970 may be determined as the first priority, the second lowest group area 930 may be determined as the second priority, the first lowest group area 910 may be determined as the third priority, and the third lowest group area 950 may be determined as the fourth priority.

As such, by dividing the area where the users are concentrated in the entire area 600, it is possible to determine the routes of the robots that can effectively cope with a situation in which the user needs guidance.

Accordingly, the robots may move to areas where the users are concentrated, and provide the guidance services desired by the users.

Figure 10:
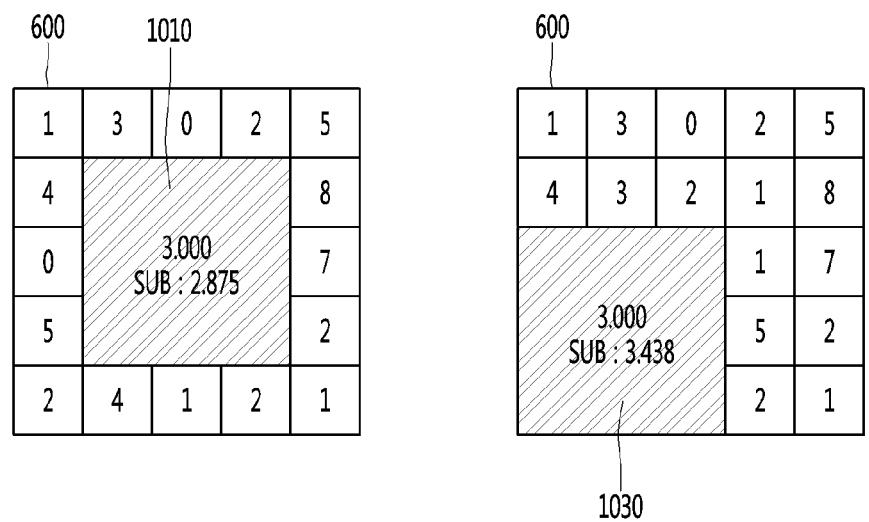
FIG. 10 is a view illustrating a method for determining priorities among group areas having the same density according to an embodiment of the present invention.

FIG. 10 is a view illustrating a method for determining priorities among group areas having the same density according to an embodiment of the present invention.

Referring to FIG. 10, the calculated densities for the 3×3 fifth group area 1010 and the sixth lowest group area 1030 included in the entire area 600 are equal to 3.000, respectively.

As such, when the calculated densities for the group areas are the same, the processor 260 may calculate a sub-density average value for the group areas and compare the calculated sub-density average values to determine priority.

Here, the sub-density average value means the average value of the densities calculated for the immediately lower group areas included in the group area. The immediately lower group area may refer to group areas having a size smaller by one unit.

For example, when the sub-density for the 4×4 group area is calculated, the processor 260 may calculate the densities for the four 3×3 subgroup areas included in the group area, and calculate the sub-density average value by calculating an average value of the calculated densities.

In the example of FIG. 10, the processor 260 may determine the sub-density average values of the fifth group area 1010 and the sixth group area 1030 so as to determine the priority between the fifth group area 1010 and the sixth group area 1030.

That is, the processor 260 may compare the average value (2.875) of the densities for the subgroup areas included in the fifth group area 1010 with the average value (3.438) of the densities for the subgroup areas included in the sixth group area 1030.

Since the sub-density average value (3.438) of the sixth group area 1030 is larger than the sub-density average value (2.875) of the fifth group area 1010, the processor 260 may give a higher priority to the sixth group area 1030 than to the fifth group area 1010.

Alternatively, in a situation where the densities are the same among the group areas other than the lowest group area, the processor 260 may determine the priority among the group areas by using the densities for the adjacent unit areas as in a method of FIG. 11 described below.

Figure 11:
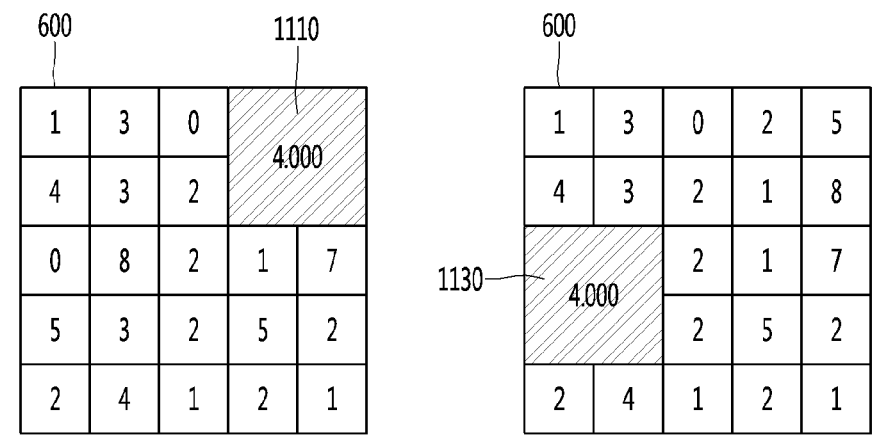

FIG. 11 is a view illustrating a method for determining priorities among group areas having the same density according to an embodiment of the present invention.

FIG. 11 illustrates a method for determining the priority among group areas, and may be applied when determining the priority among the lowest group areas in which the method for calculating the sub-density average value described with reference to FIG. 10 is not applicable. It is apparent that the method for determining the priority in FIG. 11 may also be applied when determining the priority among group areas other than the lowest group area.

Referring to FIG. 11, the calculated densities are equal to 4.000 for the 2×2 seventh group area 1110 and the 2×2 eighth group area 1130 included in the entire are 600, respectively.

As such, when the calculated densities for the group areas are the same, the processor 260 may calculate an adjacent density average value for the group areas and compare the calculated adjacent density average values to determine priority.

The adjacent density average value means the average value of the densities calculated for the unit areas adjacent to the group area.

Here, the unit areas adjacent to the group area may mean adjacent unit areas of up, down, left, and right positions adjacent to the group area, or may mean only adjacent unit areas of adjacent up, down, left, and right positions from the group area.

In the example of FIG. 11, the processor 260 may determine the adjacent density average values of the seventh group area 1110 and the eighth group area 1130 so as to determine the priority between the seventh group area 1110 and the eighth group area 1130.

In one embodiment, the adjacent density average value of the seventh group area 1110 may be calculated as $(0+2+1+7)/4=2.5$, which is the average value of the densities for the unit areas adjacent in up, down, left, and right directions of the seventh group area 1110. The adjacent density average value of the eighth group area 1130 may be calculated as $(4+3+2+2+2+4)/6=2.833$, which is the average value of the densities for the unit areas adjacent in up, down, left, and right directions of the eighth group area 1130.

That is, the processor 260 may compare the average value (2.5) of the densities for the unit areas adjacent to the seventh group area 1110 and the average value (2.833) of the densities for the unit areas adjacent to the eighth group area 1130.

Since the adjacent density average value (2.833) of the eighth group area 1130 is larger than the adjacent density average value (2.5) of the seventh group area 1110, the processor 260 may give a higher priority to the eighth group area 1130 than to the seventh group area 1110.

Figure 12:
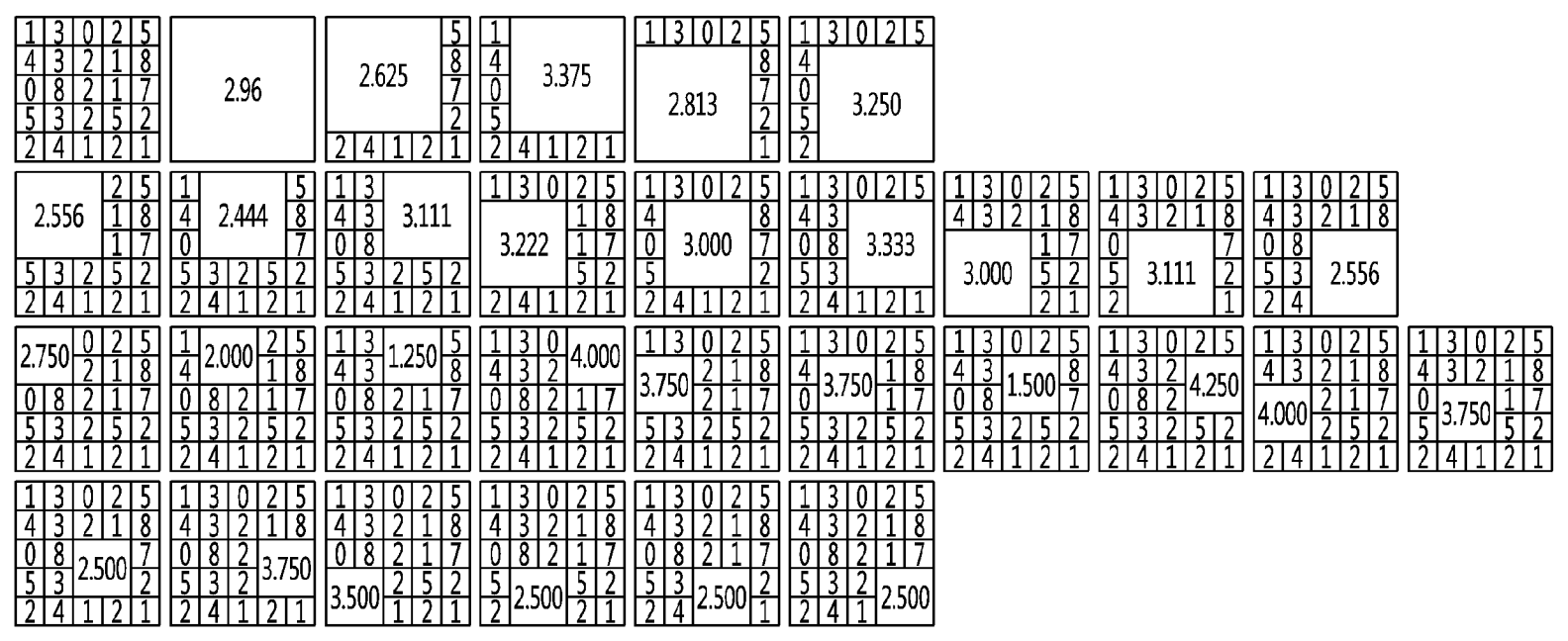

FIG. 12 is a view illustrating an example of density data for a control area illustrated in FIG. 6.

Referring to FIG. 12, the density data for the control area includes the density calculated for each group area.

That is, the density data for the control area in which 25 unit areas are arranged in 5×5 may include a density for one 5×5 group area (or control area), a density for four 4×4 group areas, a density for nine 3×3 group areas, a density for 16 2×2 group areas, and a density for 25 1×1 group areas (or unit areas).

Figure 13:
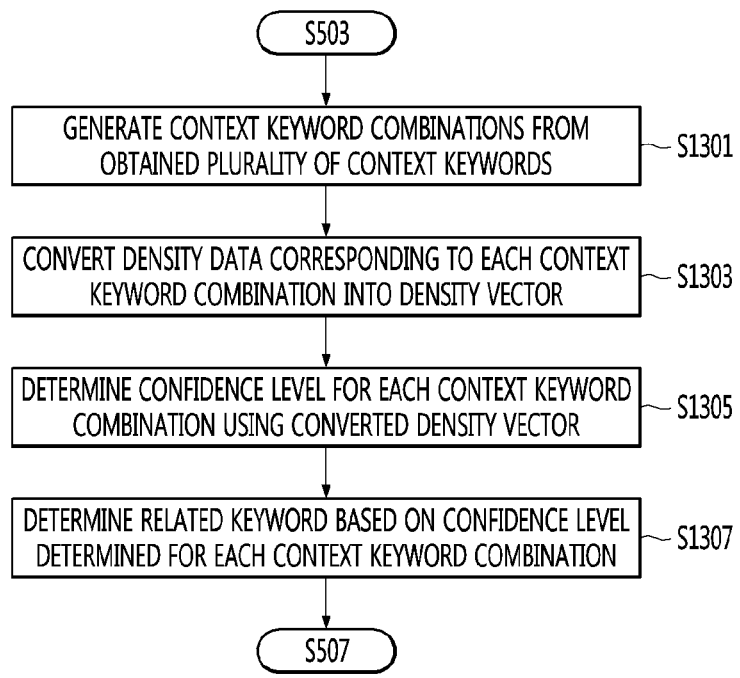
FIG. 13 is a flowchart illustrating an example of a step S505 of determining a related keyword illustrated in FIG. 5.

FIG. 13 is a flowchart illustrating an example of a step S505 of determining a related keyword illustrated in FIG. 5.

Referring to FIG. 13, the processor 260 of the AI server 200 generates context keyword combinations from the obtained plurality of context keywords (S1301).

Since the processor 260 obtains a plurality of context keywords corresponding to the current time in step S503, the processor 260 may use the plurality of context keywords to generate a plurality of context keyword combinations.

Here, the processor 260 may essentially include the context keyword for the time in each context keyword combination. Therefore, if the number of context keywords is n, the number of context keyword combinations may be calculated as $2n^{-1}-1 = {}_{n-1}C_1 + {}_{n-1}C_2 + \ldots + {}_{n-1}C_{n-1}$.

For example, if the obtained context keywords are "sunny", "summer", and "11:00-11:30", the processor 260 may generate three context keyword combinations as follows: {"11:00-11:30", "sunny"}, {"11:00-11:30", "summer"}, {"11:00-11:30", "sunny", "summer"}.

The processor 260 of the AI server 200 converts the density data corresponding to each context keyword combination into a density vector (S1303).

Here, the processor 260 may convert, into the density vector, each of the at least one density data including the context keywords included in each context keyword combination with respect to each generated context keyword combination.

For example, if the first context keyword combination is {"11:00-11:30", "sunny"}, the processor 260 may convert, into the density vector, each of the density data including "11:00-11:30" and "sunny" as the context keywords among the density data. Similarly, if the second context keyword combination is {"11:00-11:30", "summer"}, the processor 260 may convert, into the density vector, each of density data including "11:00-11:30" and "summer" as the context keywords among the density data.

The density data may be composed of the density for the control area, and may include the density for the entire control area, the density for the group areas included in the control area, and the density for the unit areas included in the control area.

As described above, the entire control area is included in the group area, and the unit area is also included in the group area.

For example, if it is assumed that the group area includes four unit areas having the same size arranged in 2×2, the density data includes the density for the 2×2 group areas (the entire control area), and the four 1×1 group areas (single areas).

The processor 260 may convert the density for each group area included in the density data into a density vector according to a predetermined order, and the predetermined order may mean the order of the respective group areas.

Here, the processor 260 may determine the order of the respective group areas based on the size and position of the group area, and may generate the density vector by filling the density corresponding to each group area with the terms of the density vector in a predetermined order.

For example, if a specific control area is composed of a total of five group areas, the processor 260 may determine the order of five group areas based on the size and position of the group area as follows: a first group area, a second group area, a third group area, a fourth group area, and a fifth group area. By filling the density for each group area with the terms of the density vector based on the determined order, (the density vector)=(the density for the first group area, the density for the second group area, the density for the third group area, the density for the fourth group area, the density for the fifth group area) may be generated from the density data.

Here, the method or rule for converting the density data into the density vector should be equally applied to all the density data. For example, when converting the first density data into the first density vector, if the density for the group area corresponding to the entire control area is determined as the first term of the first density vector, the density for the group area corresponding to the entire control area should be determined as the first term of the second density vector even when converting the second density data into the second density vector.

That is, even for the density vector converted from different density data, the specific term in each density vector corresponds to a specific group vector.

Here, the processor 260 may convert only the density data corresponding to the generated context keyword combination into the density vector, but may convert all the density data into the density vector.

The processor 260 of the AI server 200 determines the confidence level for each context keyword combination using the converted density vector (S1305).

The confidence level for the context keyword combination may mean an influence on the density within the control area. Therefore, that the confidence level for the context keyword combination is high may mean that the density distribution of the current control area is similar to the density distribution of the control area according to the density data corresponding to the context keyword combination.

Since there are a plurality of density vectors converted for each context keyword combination, it can be said that the confidence level of the context keyword combination is high when the similarity between the density vectors corresponding to a specific context keyword combination is high.

Here, the processor 260 may calculate a variance between a plurality of density vectors corresponding to each context keyword, and may give a high confidence level to a lower variance. That the variance between density vectors is low means that the density vectors are similar to each other. Therefore, it means that the density distribution in the control area is similar under the context keyword combination. That the density distribution under a specific context keyword combination is similar means that the context keyword combination has a great influence on the density distribution. Therefore, the confidence level of the context keyword combination may be calculated to be high.

For example, it is assumed that the density vectors corresponding to the first context keyword combination {"11:00-11:30", "sunny"} are (1, 3, 2, 0, 1), (2, 4, 2, 0, 0), (1, 3, 2, 1, 1), and (0, 3, 1, 0, 0), and the density vectors corresponding to the second context keyword combination {"11:00-11:30", "summer"} are (3, 2, 1, 2, 1), (2, 4, 3, 1, 1), (2, 0, 0, 3, 1), and (0, 1, 4, 1, 3). In this case, the average value of the density vectors corresponding to the first context keyword combination is (1, 3.25, 1.75, 0.25, 0.5), and the variance of the density vectors is (0.67, 0.25, 0.25, 0.25, 0.33). The average value of the density vectors corresponding to the second context keyword combination is (1.75, 1.75, 2, 1.75, 1.5), and the variance of the density vectors is (1.58, 2.92, 3.33, 0.92, 1).

Here, the processor 260 may calculate L2-norm with respect to the variance of the density vectors calculated for each context keyword combination. As the calculated L2-norm is lower, the confidence level for the context keyword combination may be calculated to be higher.

In the above example, L2-norm of the variance of the density vectors corresponding to the first context keyword combination is 0.15, and L2-norm of the variance of the density vectors corresponding to the second context keyword combination is 4.79. Therefore, the processor 260 may determine the confidence level for the first context keyword combination to be higher than that of the second context keyword combination.

Here, the processor 260 may calculate L2-norm with respect to the variance of the density vectors calculated for each context keyword combination, and determine a reciprocal of the calculated L2-norm as the confidence level for the context keyword combination.

In the above example, the processor 260 may determine the confidence level corresponding to the first context keyword combination {"11:00-11:30", "sunny"} as 6.67 (=1/0.15), and may determined the confidence level corresponding to the second context keyword combination {"11:00-11:30", "summer"} as 0.21 (=1/4.79).

The processor 260 of the AI server 200 determines a related keyword based on the confidence level determined for each context keyword combination (S1307).

Since context keywords included in a context keyword combination having a high confidence level can be expected to exert a great influence on the density distribution of the control area, the processor 260 may determine the context keywords included in the context keyword combination having a high confidence level as the related keywords.

Here, the processor 260 may determine the context keywords included in the context keyword combination having the highest confidence level as the related keywords. In other words, the related keywords may correspond to the context keyword combination.

In the above example, the processor 260 may determine the context keywords "11:00-11:30" included in the first context keyword combination {"11:00-11:30", "sunny"} having the highest confidence level as the related keywords.

As described above, since each context keyword combination essentially includes the context keyword for the time, the context keyword for the time may also be essentially included in the related keyword.

Figure 14:
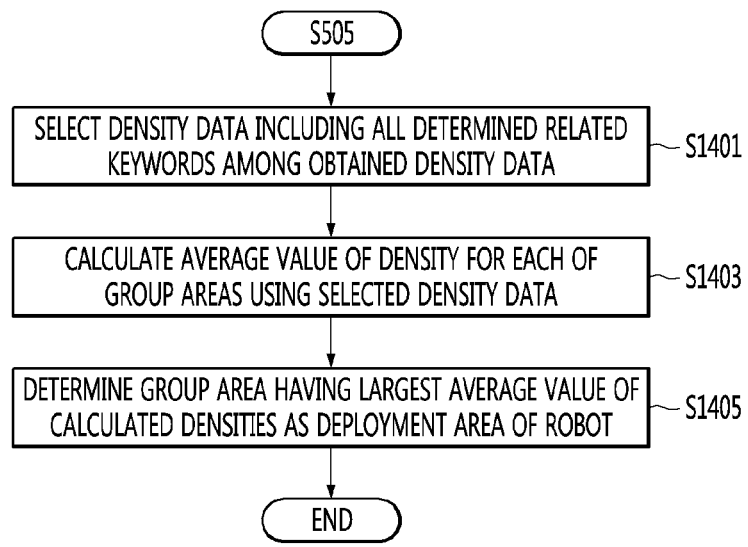
FIG. 14 is a flowchart illustrating an example of a step S507 of determining the deployment area of the robot illustrated in FIG. 5.

FIG. 14 is a flowchart illustrating an example of a step S507 of determining a deployment area of the robot illustrated in FIG. 5.

Referring to FIG. 14, the processor 260 of the AI server 200 selects density data including all related keywords determined from the obtained density data (S1401).

For example, if the related keyword is determined as "11:00-11:30" and "sunny," the processor 260 may select the density data including both "11:00-11:30" and "sunny" as the context keyword from the obtained density data.

The processor 260 of the AI server 200 calculates the average value of the densities for the respective group areas using the selected density data (S1403).

The average value of the densities for the group areas means calculating the average value of the density values for the same group area between different density data, and does not mean calculating the average value of the density values for different group areas.

For example, if it is assumed that there are three pieces of density data that include both "11:00-11:30" and "sunny" as the context keywords, the processor 260 may calculate the average value of the densities for the respective group areas using the three pieces of density data.

The processor 260 of the AI server 200 determines the group area having the largest average value of the calculated densities as the deployment area of the robot (S1405).

In one embodiment, the processor 260 may determine the priorities of the group areas in the descending order of the calculated average value of the density, and determine the sequence of the deployment area of the robot as the group area sequence according to the determined priority.

Figure 15:
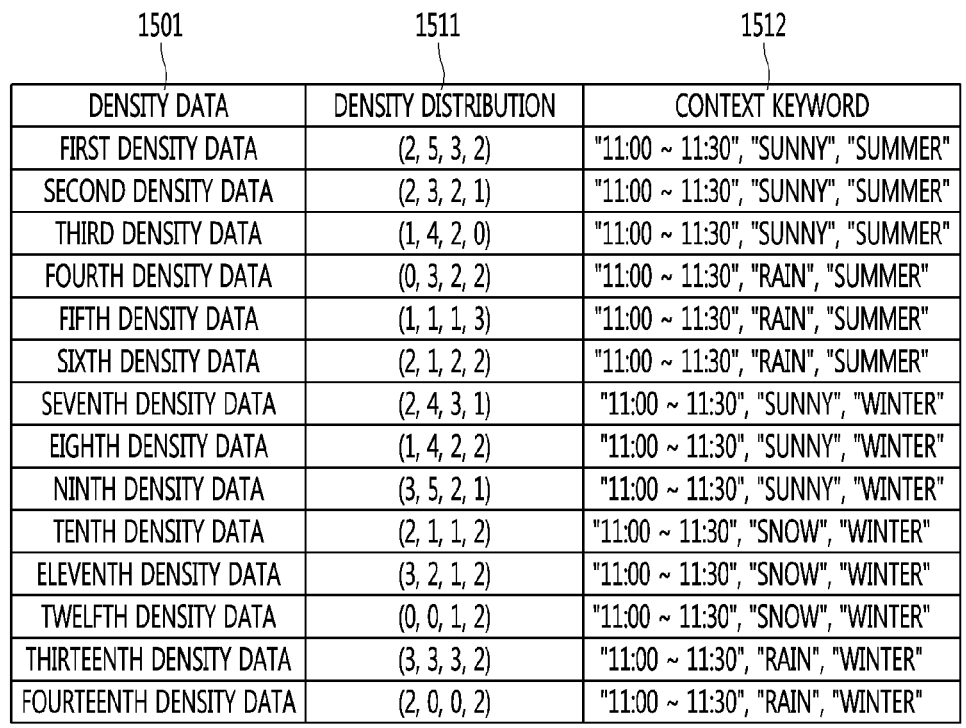
FIG. 15 is a view illustrating an example of density data according to an embodiment of the present invention.

FIG. 15 is a view illustrating an example of density data according to an embodiment of the present invention.

Referring to FIG. 15, the respective density data 1501 may include a density distribution 1511 and a context keyword 1512 corresponding to the time when the density data is collected.

FIG. 15 illustrates only the density data having the context keyword "11:00-11:30" for time, and the density data obtained by the processor 260 includes the density data including the context keyword for various times.

The density distribution 1511 includes the densities for the respective group areas.

Here, the density distribution 1511 may be the same as the density vector.

In the example of FIG. 15, the density distribution 1511 includes the density for four group areas.

There may be multiple density data 1511 having the same context keywords 1512.

For example, the first to third density data may include the same context keywords 1512: "11:00-11:30", "sunny", and "summer".

Figure 16:
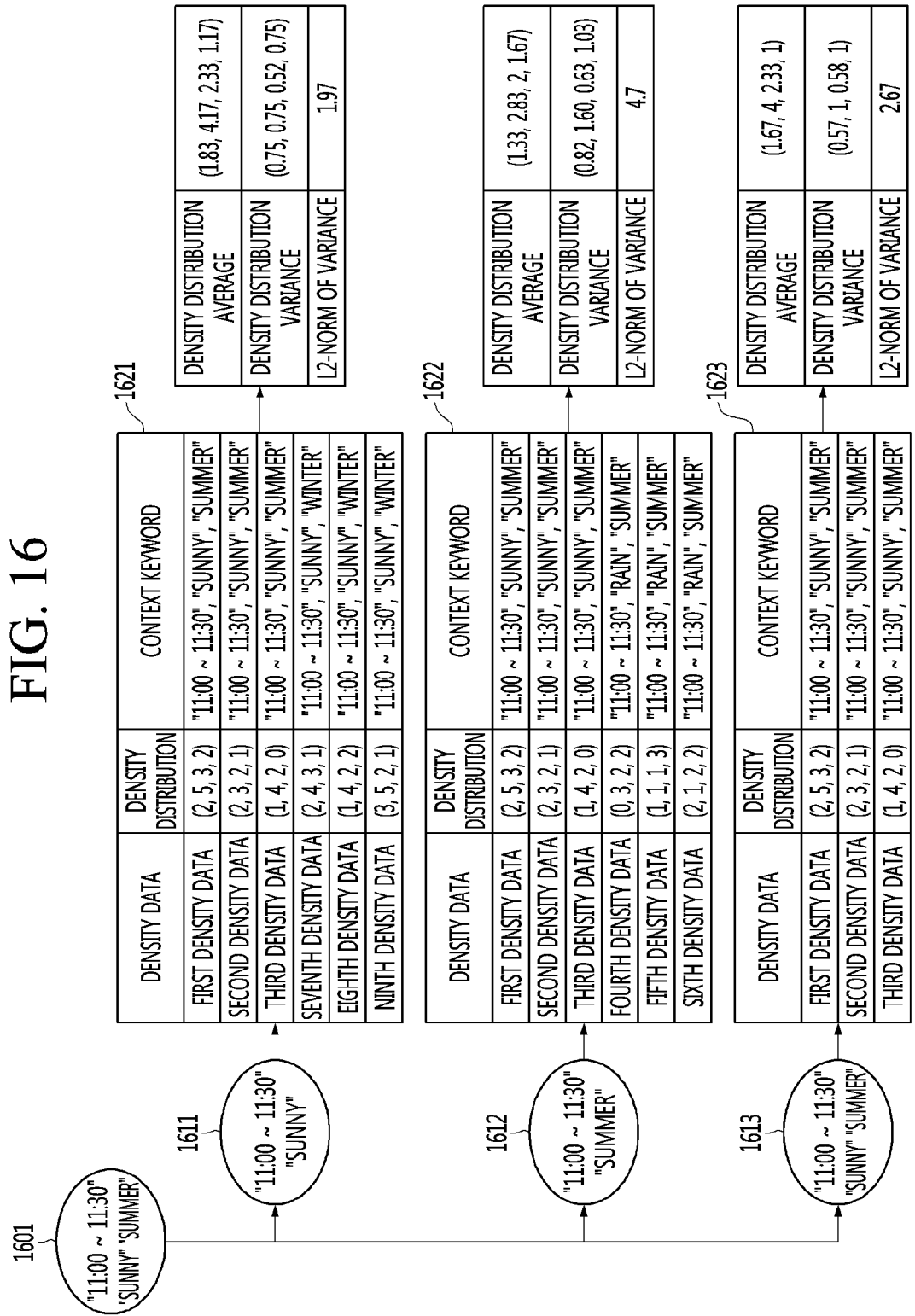
FIG. 16 is a view illustrating a method for determining a deployment area of a robot based on the density data illustrated in FIG. 15.

FIG. 16 is a view illustrating a method for determining the deployment area of the robot based on the density data illustrated in FIG. 15.

FIG. 16 assumes that the context keywords or the current context keywords 1601 corresponding to the current situation are "11:00-11:30", "sunny", and "summer."

Referring to FIG. 16, the processor 260 may generate three context keyword combinations 1611, 1612, and 1613 from the current context keywords 1601.

The first context keyword combination 1611 may include "11:00-11:30" and "sunny" as context keywords. The second context keyword combination 1612 may include "11:00-11:30" and "summer" as context keywords. The third context keyword combination 1613 may include "11:00-11:30", "sunny", and "summer" as context keywords.

The processor 260 may select the density data corresponding to the respective context keyword combinations 1611, 1612, and 1613 from the obtained density data to configure the first to third density data sets 1621, 1622, and 1623.

The first density data set 1621 may include the first to third density data and the seventh to ninth density data, including both the context keywords "11:00-11:30" and "sunny" included in the first context keyword combination 1611.

The second density data set 1622 may include the first to sixth density data, including both the context keywords "11:00-11:30" and "summer" included in the second context keyword combination 1612.

The third density data set 1623 may include the first to third density data, including all the context keywords "11:00-11:30", "sunny", and "summer" included in the third context keyword combination 1613.

The processor 260 may calculate the density distribution variance for the first to third density data sets 1621, 1622, and 1623, calculate L2-norm for the calculated density distribution variance, and calculate the confidence level for the context keyword combinations 1611, 1612, and 1613 using the calculated L2-norm.

The processor 260 may determine the context keyword combination having the highest confidence level among the context keyword combinations 1611, 1612, and 1613, and determine the context keywords included in the determined context keyword combination as the related keyword.

For example, the case in which L2-norm of the variance of the density distribution calculated from the first density data set 1621 is 1.97, L2-norm of the variance of the density distribution calculated from the second density data set 1622 is 4.7, and L2-norm of the variance of the density distribution calculated from the third density data set 1623 is 2.67 is assumed. In this case, the processor 260 may give the highest confidence level to the first context keyword combination 1611 corresponding to the first density data set 1621 having the lowest L2-norm, and determine the context keywords "11:00-11:30" and "sunny" included in the first context keyword combination 1611 as the related keywords.

The average value of the density distributions and the variance of the density average value may mean the average value of the density vectors and the variance of the density vectors.

The processor 260 may determine the dense area using the density data corresponding to the determined related keyword, and determine the determined dense area as the deployment area of the robot.

For example, if the related keywords are determined as "11:00-11:30" and "sunny," the density data corresponding to the determined related keywords are the first to third density data and the seventh to ninth density data. The processor 260 may calculate the average value of the density distributions included in the first to third density data and the seventh to ninth density data, and the calculated result may be (1.83, 4.17, 2.33, 1.17). The processor 260 may determine the second group area indicating the highest density (4.17) in the average value of the density distributions as the dense zone, and determine the deployment area of the robot as the second group area.

In one embodiment, the processor 260 may determine the dense area sequence as (the second group area, the third group area, the first group area, and the fourth group area) in the descending order of the density based on the average value (1.83, 4.17, 2.33, 1.17) of the density distribution, and may determine the deployment area sequence of the robot as (the second group area, the third group area, the first group area, and the fourth group area).

Furthermore, the processor 260 may predict the density distribution for the time period after the current time by using the density data including all the related keywords except for the context keyword for the time among the related keywords, determine the dense area sequence based on the predicted density distribution, and determine the deployment area sequence of the robot based on the determined dense zone sequence. In this case, the deployment area sequence of the robot may include time information and the deployment area corresponding to the time information.

For example, if the related keywords are determined as "11:00-11:30" and "sunny", the processor 260 may select the density data including "sunny" as the context keyword from the obtained density data, classify the selected density data into "11:30 to 12:00", "12:00-12:30", etc. based on the context keyword for the time, and calculate the density distribution corresponding to the context keyword for each time using the divided density data. The processor 260 may determine the dense area sequence based on the dense area corresponding to the context keyword for each time based on the calculated density distribution, and may determine the deployment area sequence of the robot based on the dense zone sequence.

According to various embodiments of the present invention, it is possible to identify the context having a great influence on the density within the control area among the contexts indicating the current situation, determine the density suitable for the current situation by determining the dense area based on the identified context, and effectively provide various services to the users by using the robots in the dense area.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

What is claimed is:

1. An artificial intelligence server for determining a deployment area of a robot, the artificial intelligence server comprising:
   a memory configured to store density data for a control area; and
   a processor configured to:
      obtain a plurality of current context keywords corresponding to a current time point;
      determine at least one related keyword among the obtained plurality of current context keywords using the density data; and
      determine the deployment area of the robot based on density data corresponding to the determined related keyword,
   wherein the control area includes a plurality of unit areas and is a maximum activity range of the robot,
   wherein the plurality of current context keywords essentially include a context keyword for a time corresponding to the current time point, and further include a context keyword for at least one of day, weather, season, or date corresponding to the current time point, and
   wherein the processor is further configured to:
      generate context keyword combinations from the obtained plurality of current context keywords;
      convert density data corresponding to each of the context keyword combinations into a density vector;
      determine a confidence level for each of the context keyword combinations using the converted density vector; and
      determine the related keyword based on the confidence level determined for each of the context keyword combinations.

2. The artificial intelligence server according to claim 1, wherein the density data includes at least one context keyword corresponding to a density distribution for the control area or a target time point of calculating the density distribution, and
   wherein the density distribution for the control area includes a density for each of at least one group area included in the control area.

3. The artificial intelligence server according to claim 1, wherein each of the context keyword combinations includes a context keyword for the time.

4. The artificial intelligence server according to claim 3, wherein the processor is configured to:
   calculate a variance between the converted density vectors for each of the context keyword combinations; and
   determine the confidence level to be higher as the calculated variance is smaller.

5. The artificial intelligence server according to claim 1, wherein the processor is configured to:
   select density data including all the determined related keywords from the density data;
   calculate an average value of density for each of group areas using the selected density data; and determine the deployment area based on the calculated average value of the density.

6. The artificial intelligence server according to claim 1, further comprising a communication unit configured to communicate with the robot,
wherein the processor is configured to:
receive, via the communication unit, image data related to the control area from the robot or a camera installed inside the control area;
generate the density data using the image data; and
store the generated density data in the memory.

7. The artificial intelligence server according to claim 6, wherein the processor is configured to:
calculate the density for each of the unit areas using the image data;
calculate density for each of group areas included in the control area based on the density calculated for each of the unit areas; and
generate the density data based on the calculated density, and
wherein each of the group areas include at least one of the unit areas.

8. The artificial intelligence server according to claim 7, wherein the processor is configured to:
recognize faces of users included in each of the unit areas from the image data using a face recognition model; and
calculate the density for each of the unit areas based on the number of the recognized faces.

9. The artificial intelligence server according to claim 8, wherein the face recognition model is learned using a machine learning algorithm or a deep learning algorithm and is configured as an artificial neural network.

10. A method for determining a deployment area of a robot, the method comprising:
obtaining density data for a control area;
obtaining a plurality of current context keywords corresponding to a current time point;
determining at least one related keyword among the obtained plurality of current context keywords using the density data; and
determining the deployment area of the robot based on density data corresponding to the determined related keyword,
wherein the control area includes a plurality of unit areas and is a maximum activity range of the robot,
wherein the plurality of current context keywords essentially include a context keyword for a time corresponding to the current time point, and further include a context keyword for at least one of day, weather, season, or date corresponding to the current time point, and
wherein the method further comprises:
generating context keyword combinations from the obtained plurality of current context keywords;
converting density data corresponding to each of the context keyword combinations into a density vector;
determining a confidence level for each of the context keyword combinations using the converted density vector; and
determining the related keyword based on the confidence level determined for each of the context keyword combinations.

* * * * *